United States Patent
Hackney

[15] 3,667,635
[45] June 6, 1972

[54] COMBINED TRUCK BODY AND WHEELED RACK AND METHOD OF LOADING AND UNLOADING A VAN

[72] Inventor: Ralph H. Hackney, Washington, N.C.
[73] Assignee: J. A. Hackney & Sons, Inc.
[22] Filed: Dec. 3, 1970
[21] Appl. No.: 94,866

Related U.S. Application Data

[62] Division of Ser. No. 841,529, July 14, 1969, Pat. No. 3,572,815.

[52] U.S. Cl.................................214/515, 296/3, 296/24, 296/35 A
[51] Int. Cl.........................................................B60p 1/64
[58] Field of Search.....................214/515; 296/24, 39, 35 A, 296/155, 3

[56] References Cited

UNITED STATES PATENTS

| | | | |
|---|---|---|---|
| 3,385,459 | 5/1968 | Wellman, Jr............................. | 214/515 |
| 2,608,420 | 8/1952 | Eck....................................... | 296/24 X |
| 2,301,639 | 11/1962 | Onstott................................. | 214/515 |
| 3,352,594 | 11/1967 | Miller .................................. | 296/24 X |
| 2,459,839 | 1/1949 | Richards............................... | 214/515 X |

Primary Examiner—Albert J. Makay
Attorney—Clarence A. O'Brien and Harvey B. Jacobson

[57] ABSTRACT

A combined van type truck body and a wheeled rack or cart of a size commensurate with the internal dimensions of the body to be loaded into or removed from the body through rear access doors with the body also including roll-up type overhead doors along each side thereof to enable access to both longitudinal sides of the rack or cart throughout the longitudinal dimension thereof so that items to be delivered may be unloaded from either side of the body at any point throughout the longitudinal length and vertical height thereof so that non-deliverable items may remain in the body without hindering delivery of items at subsequent delivery sites thereby enabling a novel method of loading and unloading a van body to be effectively practiced.

2 Claims, 11 Drawing Figures

Ralph H. Hackney
INVENTOR

BY Clarence A. O'Brien
and Harvey B. Jacobson
Attorneys

Ralph H. Hackney

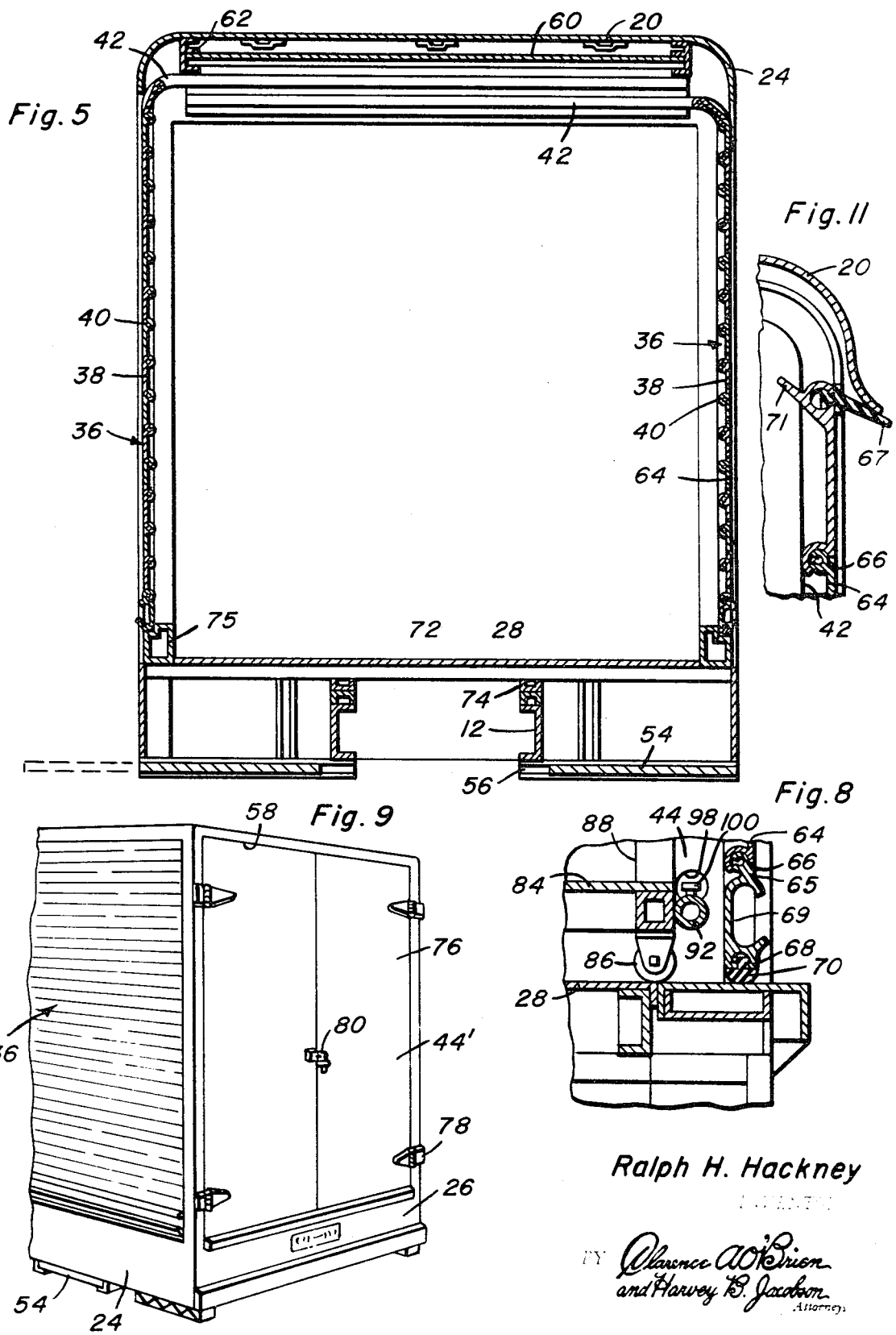

COMBINED TRUCK BODY AND WHEELED RACK AND METHOD OF LOADING AND UNLOADING A VAN

CROSS REFERENCE TO RELATED APPLICATION

This application is a division of copending application, Ser. No. 841,529, filed July 14, 1969 for "Van Body with Overhead Side Doors" now U.S. Pat. No. 3,572,815 issued Mar. 30, 1971.

BACKGROUND OF THE INVENTION

1. Field of the Invention

The present invention generally relates to the delivery of various items to customers of department stores, furniture stores, appliance stores and the like and more particularly relates to a van-type body having a plurality of roll-up side doors and a rear door assembly to enable total access to the items loaded into the body along both longitudinal sides thereof.

2. Description of the Prior Art

Delivery trucks such as those employed to deliver items to customers of establishments such as department stores and the like employ van-type bodies having rear access doors. The delivery truck will be routed in a particular manner and the items will be loaded into the truck body so that the items or item to be delivered first will be the last item or items loaded into the body so that access may be had thereto by the delivery men by opening the rear access door. One of the existent problems which reduces the efficiency of the delivery system is the relatively high incidence of non-deliverable items due to various circumstances such as the customer not being at home and not leaving instructions for delivery of the item. Under these circumstances, the item must be returned to the warehouse for delivery at a later date. When this occurs, each time a subsequent delivery is made, the undelivered item or items must be removed, placed on the street, while a subsequent item is being delivered and then replaced in the truck body which requires considerably more time and effort and reduces the efficiency of the delivery system and frequently results in damage to the items involved.

Also, loading of the truck body at the warehouse under these circumstances requires the presence of the truck body at the warehouse so that during the loading operation, the truck is idled and the operator of the truck is usually idled. This leads to congestion at the warehouse dock, inefficient utilization of the truck and inefficient utilization of personnel.

SUMMARY OF THE INVENTION

This invention provides a truck body having a rear access door assembly and a multiple of roll-up side doors extending throughout the length of each side of the van-type body. This enables the items loaded into the truck to be unloaded from the side doors so that an item may be unloaded from any point longitudinally along either side of the van body by merely opening the appropriate roll-up side door and unloading the item at street level.

This arrangement enables non-deliverable items to be retained in their loaded position and subsequent delivery of other items without disturbing the non-deliverable item thereby materially increasing the efficiency of the delivery system from the standpoint of saving time and labor involved in continually handling non-deliverable items and also reduce damage to non-deliverable items which occurs due to multiple handling thereof.

This invention also incorporates the use of a preloaded rack or cart which closely fits into the interior of the van body and which may be easily rolled into or out of the van body through the rear access door thereby enabling warehouse men to preload the rack without requiring the presence of the truck body at the warehouse dock thereby increasing the efficiency of the warehouse operation by enabling a rack to be preloaded without requiring the presence of the van body and to enable the rack to be easily and rapidly removed with any non-deliverable item thereon when the truck returns to the warehouse and a preloaded rack inserted into the van-type truck body so that very little time is required for the truck to be unloaded and reloaded for travelling along a subsequent delivery route.

DESCRIPTION OF THE DRAWING

FIG. 5 is a transverse, sectional view of the truck body illustrating the association of the overhead roll-up side doors and the overhead roll-up rear door.

FIG. 8 is a detailed sectional view of the rear lower corner of the truck body illustrating the association of the lock bar, the preloaded rack and the truck body.

FIG. 9 is a rear perspective view of the truck body illustrating the use of pivot doors defining the rear access door to the truck body.

FIG. 11 is a sectional view illustrating the relationship of the upper edge of the roll type door and roof.

DESCRIPTION OF THE PREFERRED EMBODIMENTS

Figure 1:
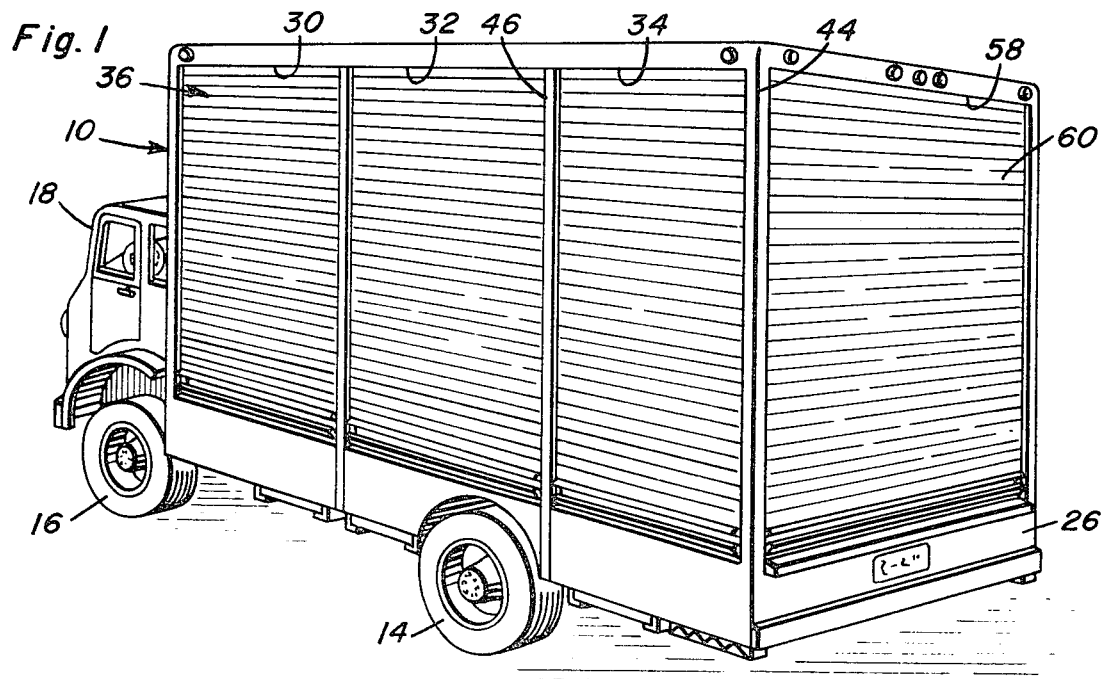
FIG. 1 is a perspective view of the van-type truck body with the rear access door and side doors in closed position.

Referring now specifically to the drawings, the van type truck body of the present invention is generally designated by numeral 10 and is supported in a conventional manner from a truck construction which includes longitudinal chassis members 12, supporting rear drive wheels 14, front steerable wheels 16, an operator's cab 18, and other components of conventional van truck structures. The details of the structure of the truck are not illustrated in that the van type truck body may be incorporated into various types of trucks by using standard procedures for supporting truck bodies on a truck chassis. The truck body 10 includes a roof 20, a front wall 22, side walls 24 and a rear wall 26. A supporting floor 28 is disposed horizontally above the chassis members 12 and combine with the other components of the truck body to enclose a load carrying space.

The side walls 24 are each provided with three large open areas 30, 32 and 34 with each of the open areas being closed by a roll-up type overhead door 36. Each door 36 includes a plurality of longitudinal sections 38 hingedly interconnected by hinge structures 40 which represents conventional roll-up type overhead doors. The ends of the doors 36 are supported from facing channel-shaped tracks 42 which extend down alongside of each opening and laterally inwardly below the roof 20 as illustrated in FIG. 5. As illustrated, the tracks 42 are disposed in vertically spaced relation to each other so that when the side doors 36 opposite sides of the truck body are elevated, the doors will be disposed in vertically spaced relation. The door structures themselves are defined in more detail hereinafter, and are constructed so that the cargo carried in the load space will be protected from inclement weather and also be securely latched or locked for protection against theft.

Figure 2:
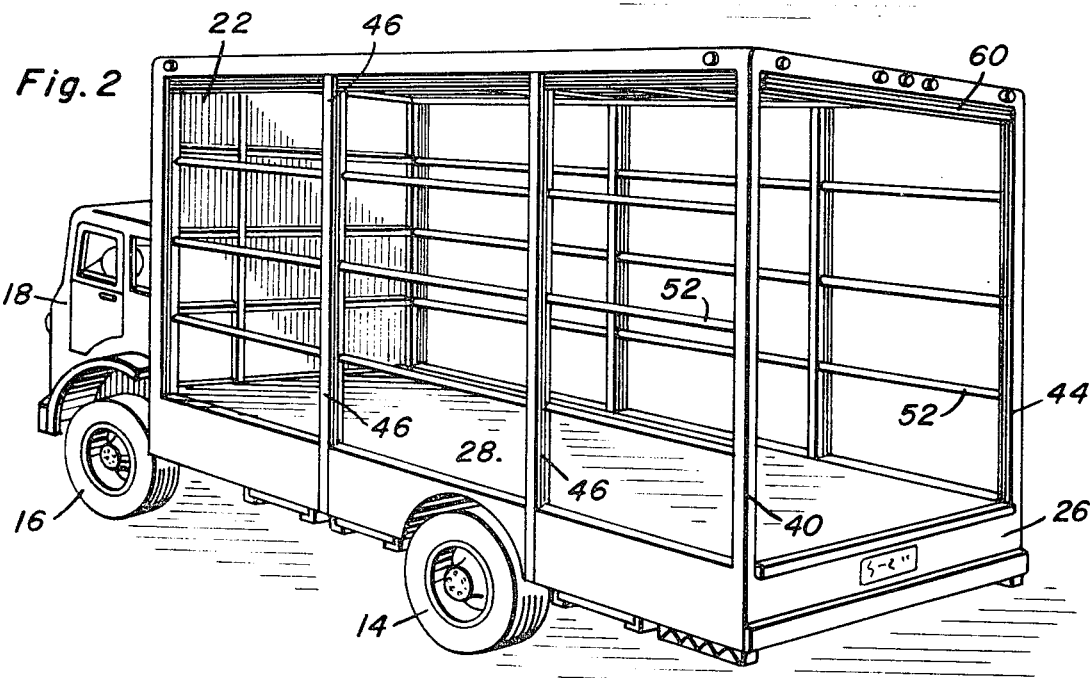
FIG. 2 is a perspective view similar to FIG. 1 with all of the doors in open position and tie bars in position.
Figures 6, 10:
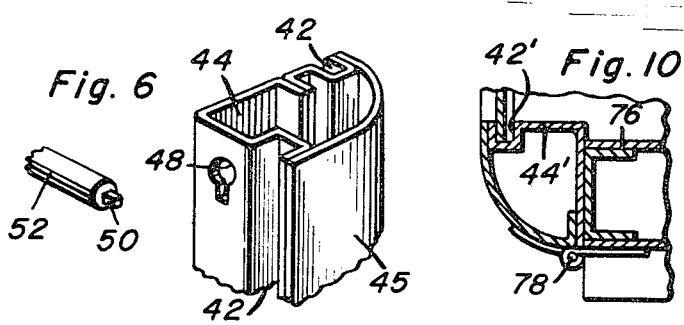
FIG. 6 is a detailed fragmental perspective view of one of the vertical posts illustrating longitudinal tie-bars associated therewith.
FIG. 10 is a sectional view of the rear corner post employed with the side hinged rear doors.

The front of the opening or doorway 30 and the rear of the opening or doorway 34 are defined by corner members 44 (see FIG. 6) in the form of a rigid frame member having the channel tracks 42 incorporated therein with a curved corner member 45 attached thereto in any suitable manner. The opening or doorway 32 is delineated by vertical supporting posts 46 which also have channel tracks thereon. Each of the supporting posts 46 as well as the corner members 44 have a plurality of facing pairs of keyhole slots 48 formed therein for receiving the reduced ends 50 of longitudinal tie bars 52. The tie bars 52 provide a tie point in the center of the doorway for securing portions of the load with a rope, strap or the like. The position of the tie bars 52 is illustrated in FIG. 2 and the particular construction of one of the rear corner members 44 is illustrated in FIG. 6 in which the channel shaped tracks 42 are combined into a rigid assembly. The supporting posts 46 will be of similar construction but opposed channel tracks and opposed keyhole slots are provided on each post 46.

Figure 3:
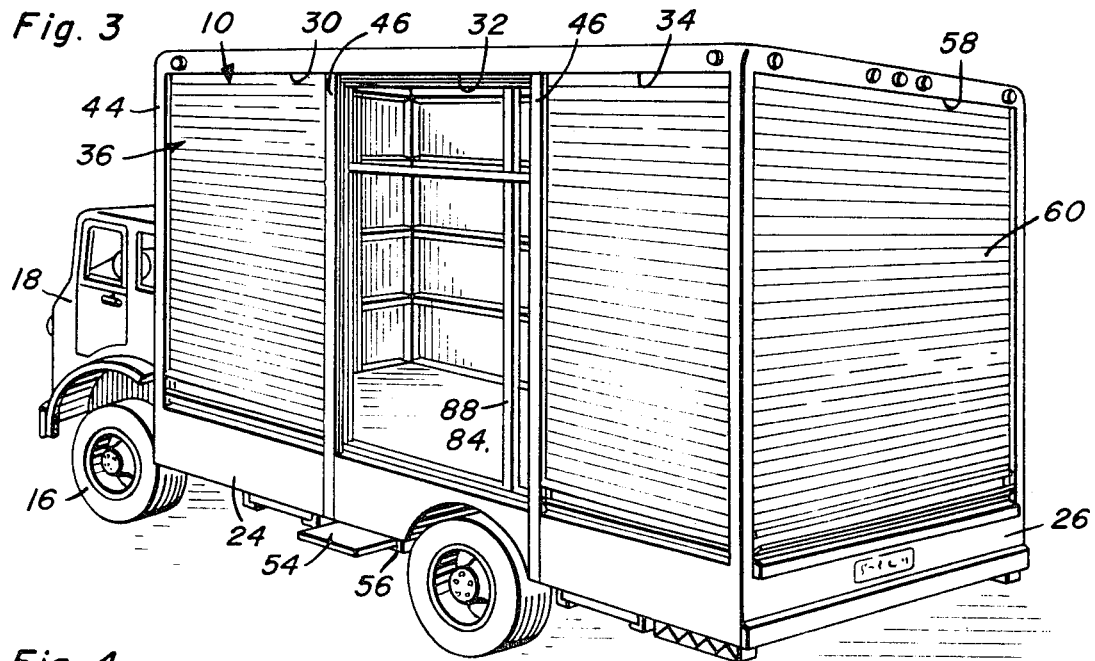
FIG. 3 is a perspective view similar to FIG. 1 with one of the roll-up side doors open and the slide-out step associated therewith in extended position.

With this construction, as illustrated in FIG. 3, any one or all of the side doors 36 may be opened and any one or all of the tie bars 52 may be removed to provide access to the interior of the enclosure and to items loaded therein throughout the length of the truck body along each side thereof. If an item to be unloaded is at the top of the load carrying space, a slide-out step 54 is provided below each open area 30, 32 and 34. The steps 54 are in the form of a rigid panel slidably supported by inwardly facing guides 56 defined by L-shaped members or angle iron members attached to the lower edge of the side walls structure 24 and the lower edges of the chassis member 12 as illustrated in FIG. 5. Any suitable latch structure may be provided for releasably retaining the slide-out steps 54 in their retracted position and in their extended position so that a person may pull out a step 54 and stand thereon to obtain an item placed high in the load carrying body.

The rear wall 26 is provided with an enlarged open area 58 closed by a rear roll-up type overhead door 60 supported by opposed channel-shaped tracks 42 which are disposed below the roof 20 and down the interior edges of the rear corner members 44 with the door 60 being disposed above the side doors 36 when in their overhead position.

As illustrated in FIG. 8, the rear door 60 is of the same construction as the side doors 36 and includes a plurality of relatively narrow panels 64 interconnected by hinge structures 66. The lowermost panel 65 has a rubber bottom sealing strip or bumper 68 engaged with the floor or an extension thereof as at 70. Also, a recessed handle or handgrip 69 is incorporated therein to facilitate opening and closing of the door. The uppermost panel of the rear door 60 is provided with an outwardly and downwardly inclined resilient sealing flap 67 and an inwardly and upwardly inclined flange 71 for rigidifying the door. Conventional lock structures may be provided to adequately protect the cargo being carried by the truck body. The truck body is supported and braced in a conventional manner with the floor 28 being supported by transverse support beams 72 which are supported from the chassis members 12 by longitudinal support members 74 and corner bracing or reinforcing members 75 are provided along each side of the truck body with the framing and bracing being of sufficient strength to adequately support the truck body from the chassis members 12 and to retain the truck body in substantially a rigid position to withstand the normal forces encountered by such a van truck during over-the-road transport of various items.

FIG. 9 illustrates a van truck body with a pair of doors 76 extending vertically in the opening in the rear wall with hinge structures 78 hingedly supporting each rear door 76 at its outer side edge thereof to the corner member 44'. The meeting edges of the doors 76 are interconnected by a suitable latch and lock device 80 to retain the side hinged doors 76 in closed position. Thus, the rear door assembly may be either a side hinge door assembly as illustrated in FIGS. 9 and 10 or an overhead door assembly illustrated in FIGS. 1-8 and 11 of the drawings with it being necessary that the rear door assembly provides free access into the interior of the load carrying space.

Figure 4:
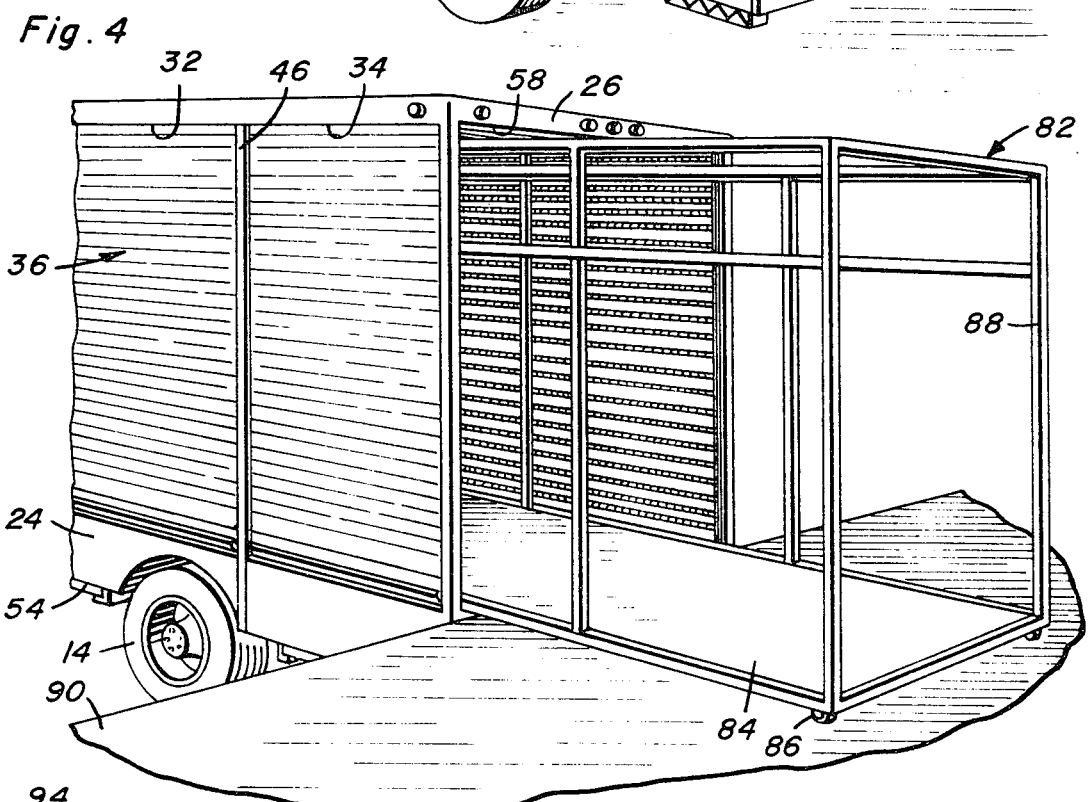
FIG. 4 is a perspective view of the rear portion of the van body illustrating its association with the warehouse dock and a rack or cart which may be easily inserted into or removed from the van body.
Figure 7:
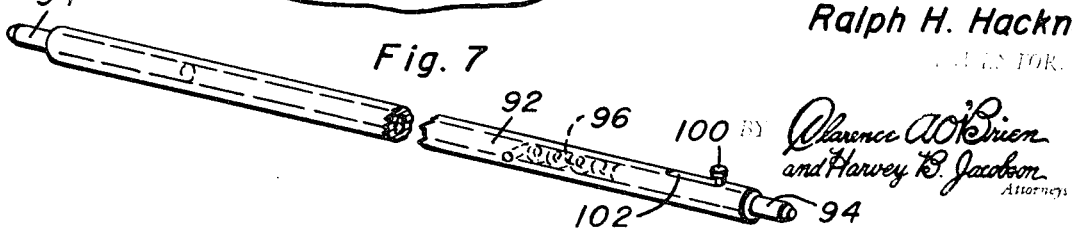
FIG. 7 is a perspective view of a locking bar for retaining the preloaded rack or cart stationary in the truck body.

The open rear of the truck body provided by the rear door assembly 60 or the rear doors 76 enables a rack or cart generally designated by the numeral 82 to be easily rolled into or removed from the truck body 10 as illustrated in FIG. 4. The rack or cart includes a supporting floor 84 provided with rollers or wheels 86 thereon and a skeleton framework 88 rigid therewith to provide a support for a plurality of items to be delivered. This enables the rack 82 to be placed in the warehouse and preloaded by warehousemen and then rolled onto a loading dock 90 and quickly loaded into the van truck body 10 when it is in loading position at the dock 90 as illustrated in FIG. 4. Thus, assuming that the truck in FIG. 4 has just delivered all of the items, the rack 82 that is empty may be quickly removed from the truck body and a preloaded rack rolled from the dock 90 onto the floor 28 of the truck body. The rack 82 has an external dimension substantially equal to the internal dimensions of the enclosed space of the truck body and a locking bar 92 is provided for positioning across the rear of the truck body to retain the rack 82 immovable within the truck body when loaded. The locking bar 92 includes reduced ends 94 with one of the reduced ends 94 being slidable and spring biased outwardly by a compression spring 96 so that the reduced ends 94 or pins are received in circular holes 98 formed in the rear corner members 44. A handle 100 is provided on the movable end 94 and extends through a slot 102 to enable retraction of the movable end 94 to enable assembly and disassembly of the locking rod 92 across the load carrying space of the load body and rearwardly of the rack 82 as illustrated in FIG. 8 to retain the rack in position in the truck body and prevent relative shifting therebetween.

In the use of the present invention, racks 82 are preloaded at the warehouse with vertical posts and horizontal bars incorporated therein adjusted to accommodate items of various sizes. The preloaded racks are rolled into the truck body and secured in place in a very short time. The truck is then driven to a point of delivery of an item and one of the six roll-up side doors is opened and most items can be reached by standing at street level but if necessary, a slide out step may be extended while a higher item is being moved. If items of extra length are to be delivered such as rolled carpet or the like, they may be loaded at the top of the preloaded rack or at any other point thereon and accessible from the rear of the rack so that the rear door can be opened for access to extra length items. The items may be quickly and easily secured in the rack at the warehouse to provide for maximum protection of merchandise. A load itinerary provided for the driver shows him the exact location of each item listed by the best delivery sequence. The driver then spends full time making deliveries rather than being idle while loading and unloading at a dock. If items are non-deliverable and must be returned to the warehouse, they do not impede access to other items due to the six roll-up doors which provide total access to the load along each side thereof. The returned items are quickly and easily unloaded by removing the rack when the truck returns to the dock. Thus, this eliminates rearrangement of the loaded items by deliverymen when one of the items is not deliverable. The preloaded rack fits snugly into the truck body and locks into place so that the rack will be stable even when the truck is driven over rough pavement. With the items secured to the rack and the rack secured to the truck body, the load is more secure than in conventional van bodies thus reducing damage. The truck body will have various required safety features incorporated therein in any suitable manner such as signal lights, running lights and the like and a central locking system may be provided for each set of side doors or any suitable type of lock mechanism may be provided for the doors to protect the cargo.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. A van type truck body providing unobstructed access to items to be delivered at a plurality of delivery points along a route comprising:
   a. a hollow body including a peripheral wall, roof and floor enclosing a load carrying space, said body including access door means at the rear end thereof for providing unobstructed access to the interior space, said rear access door means including a rear roll-up overhead door, said rear door enclosing the interior of said van and providing unobstructed access to the rear loading space of said van, said rear roll-up door comprising means engaging the lower edge thereof for sealing said door in the fully closed position, means in said rear door for manually facilitating the opening and closing of said door, means positioned at the upper end of said rear door for sealing the interior of said van from outside conditions, and means for rigidifying said rear door;
   b. a plurality of access door means along each side of said body for providing unobstructed access to the load carrying space substantially throughout the length of each side of the space thereby enabling items to be loaded into the space through the rear access door means and unloaded from either side of the space at substantially any longitudinal point therealong;
   c. guide members for the side access door means including a vertical portion extending vertically of the side walls and a horizontal portion extending transversely of the space for supporting said door;
   d. a load carrying rack having external dimensions generally equal to the internal dimensions of the enclosed load carrying space, said floor of the space being generally smooth and unobstructed, said rack being wheeled for ease of rolling along the floor into or out of the load carrying space, said rack including a vertical framework for supporting items securely thereon with the rack being capable of preloading in a warehouse and subsequently rolled into the truck body to reduce the time required for loading said van at a warehouse dock;
   e. securing means positioned and accessible adjacent the lower portion of the rear access door means to releasably retain the rack in the load carrying space, said securing means including a lock bar extending transversely of the load carrying space rearwardly of the rack to prevent rearward shifting of the rack toward the rear access door means, means on each end of said bar for releasable engagement with opposite side walls defining the load carrying space, said bar including manually manipulated means for releasing the bar; and
   f. a plurality of extendable and retractable step means supported from said body exteriorly of the load carrying space for enabling opening and closing of the side access door means and movement of the rack into and out of the space without interference from the steps, said steps being supported from the body at a point below the level of the floor of the space whereby the steps permit the unobstructed floor of the load carrying space and provide a supporting area for a person below the level of the floor of the space.

2. The structure as defined in claim 1 together with a plurality of longitudinal tie bars extending between the vertical portions of the guide members, and means for releasably connecting the tie bars to the guide members to enable insertion and removal thereof.

* * * * *